US012609371B1

(12) United States Patent
     Koh et al.

(10) Patent No.: US 12,609,371 B1
(45) Date of Patent: Apr. 21, 2026

(54) TECHNIQUES FOR CHARGING A PORTABLE COMMUNICATION DEVICE USING AN ACCESSORY DEVICE

(71) Applicant: Relay, Inc., Raleigh, NC (US)

(72) Inventors: Bokchain Koh, Crystal Lake, IL (US); Dean Thorson, Grayslake, IL (US); Matthew Newton, Park Ridge, IL (US); John Brock Preston, Leesburg, FL (US)

(73) Assignee: Relay, Inc., Raleigh, NC (US)

( * ) Notice: Subject to any disclaimer, the term of this patent is extended or adjusted under 35 U.S.C. 154(b) by 0 days.

(21) Appl. No.: 19/289,235

(22) Filed: Aug. 4, 2025

(51) Int. Cl.
     H01M 10/633 (2014.01)
     H01M 10/44 (2006.01)
     H01M 10/48 (2006.01)

(52) U.S. Cl.
     CPC ....... H01M 10/633 (2015.04); H01M 10/446 (2013.01); H01M 10/484 (2013.01)

(58) Field of Classification Search
     CPC . H01M 10/633; H01M 10/446; H01M 10/484
     USPC ....................................................... 320/149
     See application file for complete search history.

(56) References Cited

U.S. PATENT DOCUMENTS

| | | | | |
|---|---|---|---|---|
| 10,341,839 | B2 * | 7/2019 | Alfaro | H04M 1/72409 |
| 2016/0374024 | A1 * | 12/2016 | Nunez | H04M 1/72454 |
| 2018/0090942 | A1 * | 3/2018 | Nunez | H02J 7/0045 |
| 2019/0073012 | A1 * | 3/2019 | Sultenfuss | H02J 7/0068 |

* cited by examiner

*Primary Examiner* — Julian D Huffman
*Assistant Examiner* — Sadia Kousar
(74) *Attorney, Agent, or Firm* — Gregory Stephens

(57) ABSTRACT

Disclosed are techniques for charging a first battery powered portable device that is connected to a second battery powered portable device while simultaneously maintaining standard communication functions between the first and second battery powered devices. The battery levels of the first battery powered portable device and second battery powered portable device is monitored. It is then determined if the battery level of the first battery powered portable device is below a first device predetermined first threshold and if the battery level of the second battery powered portable device is above a second device predetermined threshold. If it is determined that the battery level of the first battery powered portable device is below the first device predetermined first threshold and the battery level of the second battery powered portable device is above the second device predetermined threshold, a first command may be sent to cause the second battery powered portable device to enter a charging mode that charges the first battery powered portable device.

12 Claims, 3 Drawing Sheets

FIG. 1
100
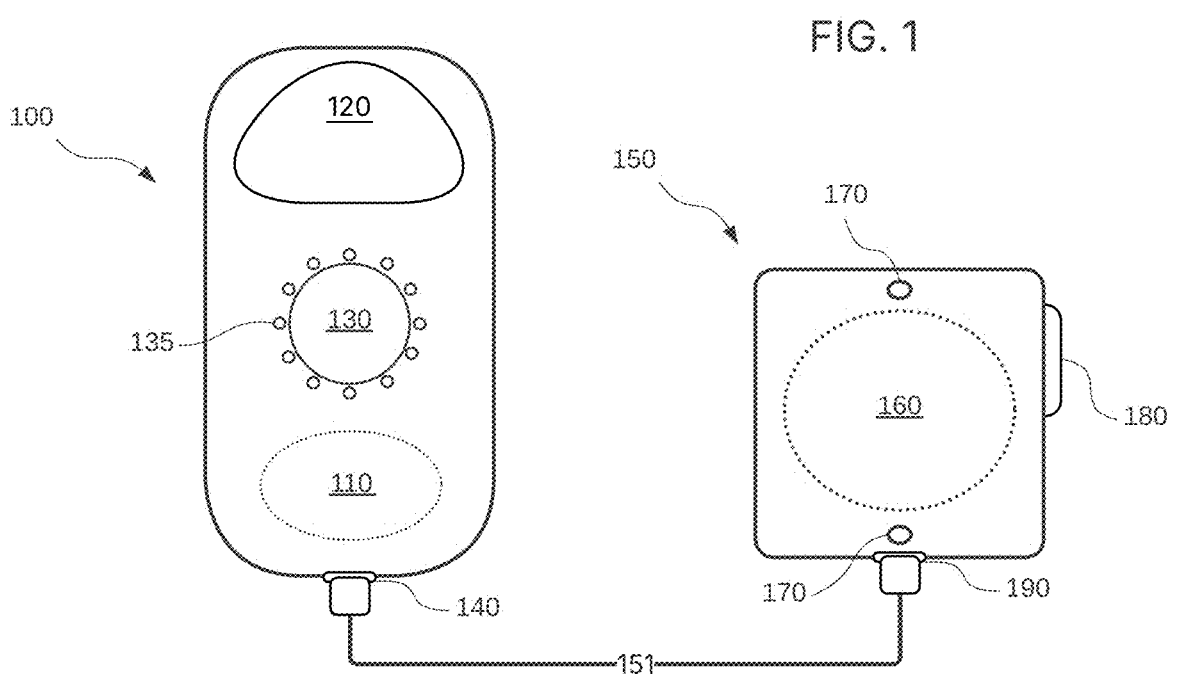
120
135
130
110
140
150
170
160
180
170
190
151
FIG. 2
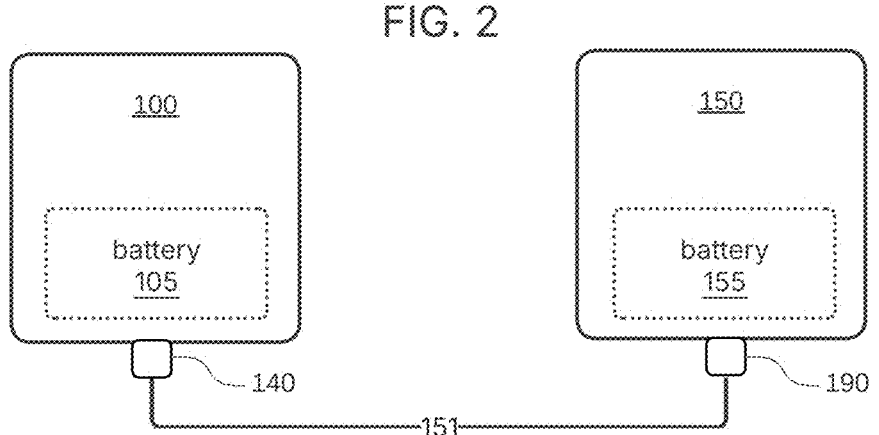
100
battery
105
140
150
battery
155
190
151
FIG. 3
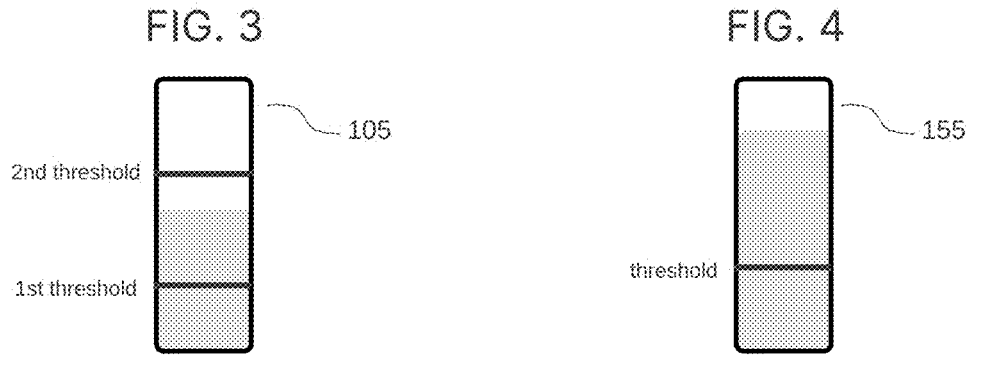
105
2nd threshold
1st threshold
FIG. 4
155
threshold

500

TECHNIQUES FOR CHARGING A PORTABLE COMMUNICATION DEVICE USING AN ACCESSORY DEVICE

BACKGROUND OF THE INVENTION

Portable communication devices (PCDs), such as two-way radios or smartphones, often experience battery depletion during a user's day or work shift. Users frequently employ accessory devices like remote speaker/microphone assemblies (RSSMAs) to enhance audio input/output, especially when the PCD's built-in microphone and speaker are inadequate. These RSSMA may contain their own independent power source or battery. It is common for the PCD's battery to deplete faster than the RSSMA's battery. When the PCD's battery level becomes too low, the device stops functioning, rendering the remaining power in the RSSMA unusable, as the RSSMA typically requires the PCD to operate. This limitation curtails the operational time for the user. There is a need for a way to utilize the RSSMA's remaining battery power to recharge the PCD when the PCD's battery is low, thereby extending the functional life of both devices. Specifically, an intelligent method is needed to monitor the battery conditions of both the PCD and RSSMA and enable charging of the PCD from the RSSMA when necessary.

SUMMARY OF THE INVENTION

In certain embodiments, there is disclosed a method for charging a first battery powered portable device that is connected to a second battery powered portable device while simultaneously maintaining standard communication functions between the first and second battery powered devices. The method may be implemented within the first battery powered portable device. The method comprises monitoring a battery level of the first battery powered portable device a battery level of a second battery powered portable device. It is then determined if the battery level of the first battery powered portable device is below a first device predetermined first threshold and if the battery level of the second battery powered portable device is above a second device predetermined threshold.

If it is determined that the battery level of the first battery powered portable device is below the first device predetermined first threshold and the battery level of the second battery powered portable device is above the second device predetermined threshold, a first command may cause the second battery powered portable device to enter a charging mode that charges the first battery powered portable device.

The method further comprises maintaining non-charging communication functions between the first battery powered portable device and the second battery powered portable device while the second battery powered portable device is in the charging mode.

The method further comprises monitoring the battery level of the first battery powered portable device while the second battery powered portable device is in the charging mode to determine if the battery level of the first battery powered portable device has reached a first device predetermined second threshold. If it is determined that the battery level of the first battery powered portable device has reached the first device predetermined second threshold, a second command may cause the second battery powered portable device to exit the charging mode.

The method further comprises monitoring the battery level of the second battery powered portable device while the second battery powered portable device is in the charging mode and if the battery level of the second battery powered portable device has fallen below the second device predetermined threshold. If so, a third command may cause the second battery powered portable device to exit the charging mode.

The monitoring the battery level of the second battery powered portable device may comprise the first battery powered portable device querying the second battery powered portable device via a communication channel between the first battery powered portable device and the second battery powered portable device. The communication channel may be carried through a cable connecting the first and second battery powered portable devices. Moreover, the cable may be configured to simultaneously permit data exchanges between the first and second battery powered portable devices as well as battery charging.

The first battery powered portable device may be a portable communication device (PCD) and the second battery powered portable device may be a remote shoulder speaker/mic accessory (RSSMA).

The methods may be implemented in a system comprising the first and second battery powered portable devices and the cable connecting them. The method may further be encapsulated in tangible machine readable computer instructions within the system that when executed cause the system to carry out the methods.

BRIEF DESCRIPTION OF THE DRAWINGS

FIG. 1 illustrates two portable battery powered devices connected to one another via a cable according to one embodiment of the invention.

FIG. 2 illustrates a generic view of the batteries for the devices according to one embodiment of the invention.

FIG. 3 illustrates a graphical representation of the battery level and relevant thresholds for a primary battery powered device according to one embodiment of the invention.

FIG. 4 illustrates a graphical representation of the battery level and relevant thresholds for the a secondary battery powered devices according to one embodiment of the invention.

DETAILED DESCRIPTION OF THE INVENTION

Figure 5:
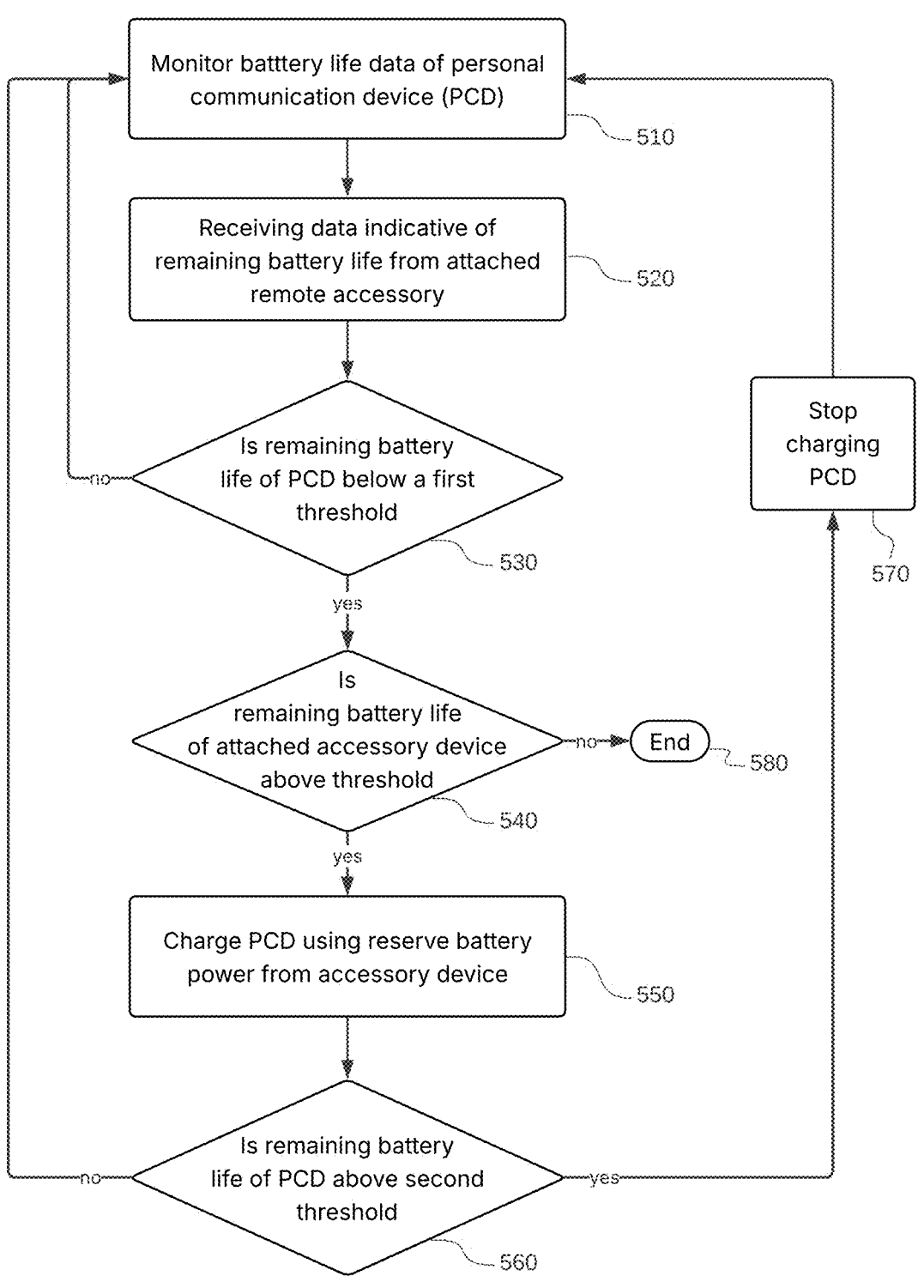
FIG. 5 illustrates a logic flow describing the method according to one embodiment of the invention.

The present invention relates to techniques and methods for extending the operational life of a first battery powered portable device such as, for instance, a portable communication device (PCD) by utilizing the battery power of a connected second battery powered portable device such as, for instance, a remote shoulder speaker/microphone assembly (RSSMA). One method involves the PCD monitoring its own battery level and the battery level of the connected RSSMA. When the PCD determines that its battery level is below a first predetermined threshold and the RSSMA's battery level is above a predetermined threshold, the PCD sends a command to the RSSMA. This command instructs the RSSMA to switch into a charging mode to supply power to the PCD. While the RSSMA is charging the PCD, normal communication functions between the PCD and RSSMA continue.

Once the PCD's battery level reaches a second predetermined threshold, the PCD sends another command to the RSSMA, instructing it to switch back to its normal operating mode, ceasing the charging process. This allows the RSSMA's battery to extend the operational life of the PCD. The process can also be reversed, allowing the PCD to charge the RSSMA if the RSSMA battery falls below a threshold and the PCD battery remains above a certain level, although priority is typically given to charging the PCD. A PCD is communicatively coupled to an RSSMA. This coupling can be wired or wireless and allows for audio transmission as well as data communication between the two devices. Both the PCD and the RSSMA contain rechargeable batteries.

In operation, the PCD monitors its own internal battery charge level. The PCD also monitors the battery charge level of the connected RSSMA, which can be achieved by querying the RSSMA through existing communication channels established between the devices.

The system employs at least three battery level thresholds: (i) a first PCD threshold that triggers the charging process; (ii) an RSSMA threshold wherein the RSSMA battery must be above this level to ensure it has sufficient charge to act as a power source without depleting itself too quickly; and (iii) a second PCD threshold to indicate the PCD has been charged sufficiently so that the charging may be stopped.

When the PCD detects that its battery level has fallen below its first threshold and that the RSSMA's battery level is currently above its threshold, the PCD initiates a charging process. The PCD transmits a specific command signal to the RSSMA via the established communication link (e.g., a cable such as, for instance, a USB cable). This command instructs the RSSMA to transition into a power-supplying mode, referred to herein as "On The Go" (OTG) mode, although other designations may be used. In OTG mode, the RSSMA directs power from its battery to the PCD through the connection interface (e.g., a USB port configured for OTG power delivery or a dedicated charging circuit).

Crucially, during the time the RSSMA is in OTG mode and actively charging the PCD, the standard communication functions between the PCD and RSSMA remain operational. This ensures the user can continue to use the RSSMA for audio input/output while the PCD is being charged.

The PCD continues to monitor its own battery level during the charging process. Once the PCD's battery level rises above its second threshold, the PCD transmits a second command signal to the RSSMA. This second command instructs the RSSMA to exit the OTG mode and return to its normal operational state, thereby stopping the power transfer to the PCD.

This process effectively uses the RSSMA as an auxiliary power source or external charger for the PCD during use, extending the PCD's operational time within a single usage cycle.

In an alternative embodiment, the logic can be reversed. If the RSSMA battery falls below a defined threshold while the PCD battery remains above a separate, sufficiently high threshold, the PCD could potentially enter a mode to charge the RSSMA. However, given that the PCD is typically the primary device, priority is generally given to maintaining the PCD's operational status. The specific threshold values for the PCD and RSSMA may be pre-configured or potentially adjustable by the user or administrator.

FIG. 1 illustrates two portable battery powered devices connected to one another via a cable according to one embodiment of the invention. A first primary battery powered device is illustrated and may be characterized herein as a personal communication device (PCD) 100. A secondary battery powered accessory device is also illustrated and may be characterized herein as a remote shoulder speaker/mic accessory (RSSMA) 150. The terms PCD and RSSMA will be referred to throughout for descriptive purposes. However, it should be noted that the first and second battery powered devices may be functionally characterized many different ways. The methods and techniques described herein are not necessarily limited to the specific battery powered devices shown here.

PCD 100 may comprise a speaker component 110, a display component 120, an operational button 130, and a set of indicator lights 135. PCD 100 may further comprise a cable port 140. Additionally, PCD 100 includes internal circuitry and components such as processors, wireless RF chipsets, and other sensors (not shown) as well as a battery component to power the PCD 100.

Similarly, RSSMA 150 may comprise a speaker component 160, microphone component(s) 170, an operational button 180, and a cable port 190. Additionally, RSSMA 150 includes internal circuitry and components such as processors, wireless RF chipsets, and other sensors (not shown) as well as a battery component to power the RSSMA 150.

A cable 151 may be utilized to electrically and communicably couple the PCD 100 and the RSSMA 150 via their respective cable ports 140, 190. Cable 151 is capable of transferring data between PCD 100 and RSSMA 150 as well as charging either of the devices using excess battery power from the other device.

In normal operation, the PCD 100 is the primary communication device having RF connectivity to a remote cloud-based network for purposes of exchanging messages and data with the network and/or other PCDs. Because the PCD may be utilized in many different environments, the use of an accessory such as the RSSMA 150 often makes sense. The RSSMA 150 may provide enhanced audio characteristics for the speaker and microphone that are superior to the native speaker and microphone(s) of the PCD 100. Thus, an RSSMA 150 is often paired with a PCD 100 to provide a superior user experience. As previously mentioned, cable 151 may be utilized to electrically and communicably couple the PCD 100 and the RSSMA 150 via their respective cable ports 140, 190.

FIG. 2 illustrates a generic view of the batteries 105, 155 for the devices according to one embodiment of the invention. A simplified view of PCD 100 illustrates the battery 105 and cable port 140 while a simplified view of RSSMA 150 also illustrates the battery 155 and cable port 190. Cable 151 is shown coupling the PCD 100 and RSSMA 150.

FIG. 3 illustrates a graphical representation of the battery level and relevant thresholds for a primary battery powered device according to one embodiment of the invention. Specifically, a graphical illustration of battery 105 shows the first and second threshold levels that are used in the methodology described below with respect to the PCD 100. The partial shading is merely an exemplary indication of the remaining battery power.

Similarly, FIG. 4 illustrates a graphical representation of the battery level and relevant threshold for a secondary battery powered device according to one embodiment of the invention. Specifically, a graphical illustration of battery 155 shows the threshold level that is used in the methodology described below with respect to the RSSMA 150. The partial shading is merely an exemplary indication of the remaining battery power.

FIG. 5 illustrates a logic flow 500 describing the method according to one embodiment of the invention. The process begins when a PCD 100 and an RSSMA 150 are coupled via cable 151. The PCD 100 is characterized as the primary device and the RSSMA is secondary. The cable 151 allows for the exchange of data—both content data and metadata—between the two devices. The intelligence executing the techniques described resides in PCD 100 and is controlled by components within PCD 100. Once connected, PCD 100 monitors its own battery status at block 510. Battery status may be expressed in percentage terms and refer to the amount of charge remaining before the PCD becomes inoperable. PCD 100 also receives battery status data from RSSMA 150 at block 520. Specifically, PCD 100 transmits a specific command signal to the RSSMA via cable 151 instructing the RSSMA to send its current battery status data to PCD 100.

Once PCD 100 has battery status data for each of the PCD 100 and RSSMA 150, it compares each to predetermined threshold levels associated with each device. For instance, in decision block 530, PCD 100 determines if the remaining battery life for PCD 100 is less than a first pre-determined threshold indicative of low battery power. If not, control is returned to block 510 to continue monitoring the battery status of the PCD 100. If the remaining battery life for PCD 100 is less than the first pre-determined threshold, PCD 100 then determines if the remaining battery life for RSSMA 150 is greater than its pre-determined threshold indicative of excess or sufficient battery power in decision block 540. If not, the process terminates 580 due to RSSMA 150 having too little battery life remaining to allow for charging of PCD 100.

If the remaining battery life for RSSMA 150 is greater than the pre-determined threshold, a process to charge PCD 100 using the remaining battery power of RSSMA 150 is initiated in block 550. Specifically, PCD 100 transmits a command signal to RSSMA 150 via cable 151 instructing RSSMA 150 to transition into a power-supplying mode that directs power from RSSMA battery 155 to PCD battery 105 through cable 151.

Once the charging process has been initiated, PCD 100 monitors the battery status of PCD 100 against a second pre-determined PCD threshold indicative of sufficient battery power in decision block 560. Specifically, if the PCD is not yet at or above the second pre-determined threshold as determined in decision block 560, control is returned to block 510 to continue monitoring PCD battery status. Otherwise, if the PCD is at or above the second pre-determined threshold as determined in decision block 560, the charging process is stopped at block 570 and control is returned to block 510 to continue monitoring PCD battery status.

Figure 6:
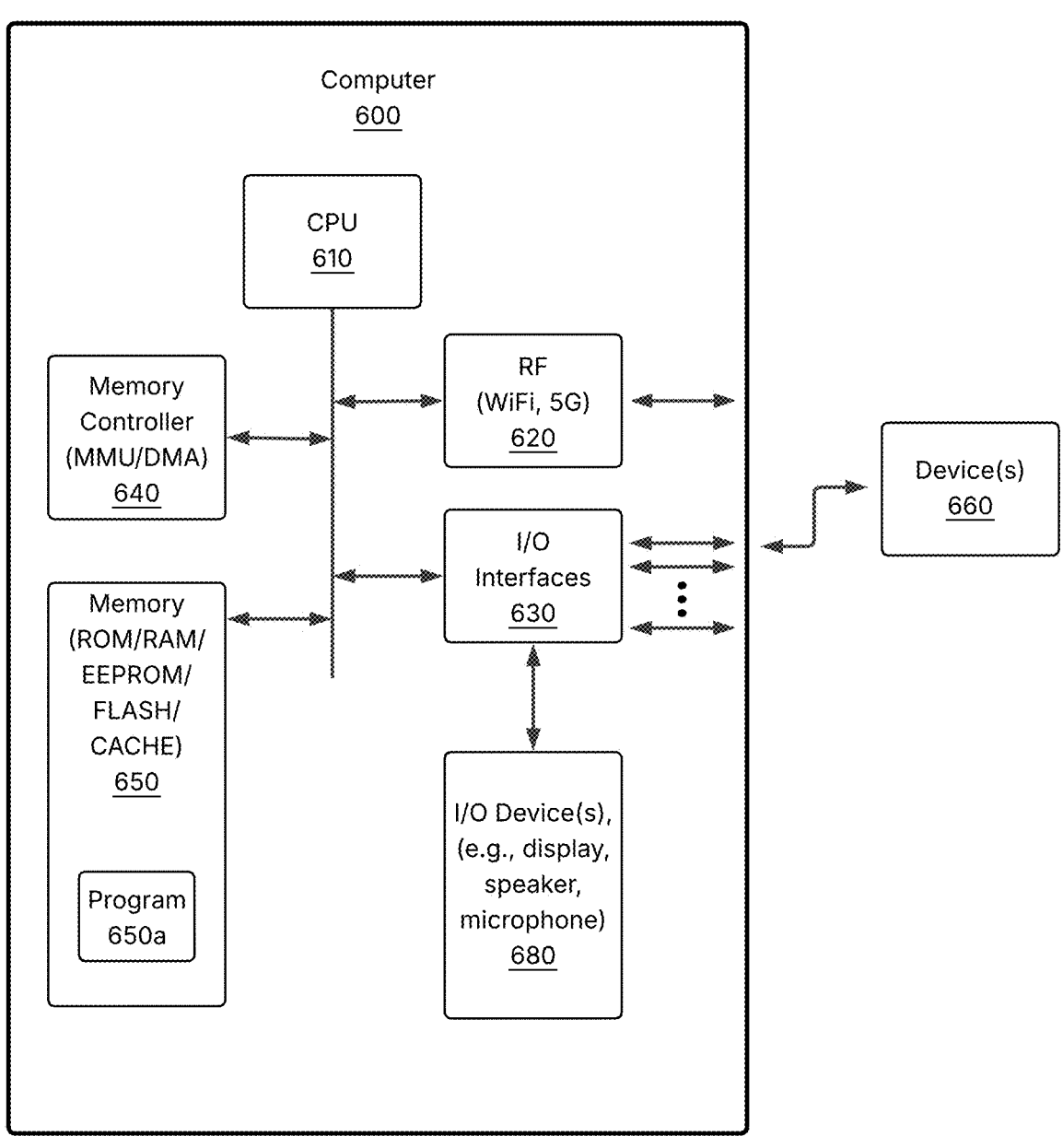
FIG. 6 illustrates an example system and components according to an embodiment of the invention.

FIG. 6 illustrates an example system and components according to an embodiment of the invention. It will be readily understood that certain embodiments can be implemented using any of a wide variety of devices or combinations of devices and components. In FIG. 6 an example of a computer 600 and its components are illustrated, which may be used in a device such as RSSMA 100 or PCD 150 for implementing certain of the functions or acts described herein, e.g., executing a profile-based configuration or other described applications, embodied in program 650a, in turn implementing acts or subsets thereof of FIG. 5. Also, circuitry other than that illustrated in FIG. 6 may be utilized in one or more embodiments. The example of FIG. 6 includes certain functional blocks, as illustrated, which may be integrated onto a single semiconductor chip to meet specific application requirements.

One or more processing units are provided, which may include a central processing unit (CPU) 610, one or more graphics processing units (GPUs), and/or micro-processing units (MPUs), which include an arithmetic logic unit (ALU) that performs arithmetic and logic operations, instruction decoder that decodes instructions and provides information to a timing and control unit, as well as registers for temporary data storage. CPU 610 may comprise a single integrated circuit comprising several units, the design and arrangement of which vary according to the architecture chosen.

Computer 600 also includes a memory controller 640, e.g., comprising a direct memory access (DMA) controller to transfer data between memory 650 and hardware peripherals. Memory controller 640 includes a memory management unit (MMU) that functions to handle cache control, memory protection, and virtual memory. Computer 600 may include controllers for communication using various communication protocols (e.g., I²C, USB, etc.).

Memory 650 may include a variety of memory types, volatile and nonvolatile, e.g., read only memory (ROM), random access memory (RAM), electrically erasable programmable read only memory (EEPROM), Flash memory, and cache memory. Memory 650 may include embedded programs, code, and software, e.g., program 650a, that provides coded methods such as illustrated and described in connection with FIGS. 5-10. By way of example, and not limitation, memory 650 may also include an operating system, application programs, other program modules, code, and program data, which may be downloaded, updated, or modified via remote devices.

A system bus permits communication between various components of the computer 600. I/O interfaces 630 and radio frequency (RF) devices 620, e.g., Wi-Fi and telecommunication radios, near field communication modules, etc., may be included to permit computer 600 to send data to and receive data from remote devices using wireless mechanisms, noting that data exchange interfaces for wired data exchange may be utilized. Computer 600 may operate in a networked or distributed environment using logical connections to one or more other remote computers or devices 660, for example in a system comprising a CPS and a set of PCDs. The logical connections may include a network, such local area network (LAN) or a wide area network (WAN) but may also include other networks/buses. For example, computer 600 may communicate data with and between device(s) 660.

Computer 600 may therefore execute program instructions or code configured to provide CPS and/or PCD functionality and perform other functionality of the embodiments. A user can interface with (for example, enter commands and information) the computer 600 through input devices, which may be connected to I/O interfaces 630. A display or other type of I/O device 680 may be connected to or integrated with the computer 600, for example via an interface selected from I/O interfaces 630.

It should be noted that the various functions described herein may be implemented using instructions or code stored on a memory, e.g., memory 650, that are transmitted to and executed by a processor, e.g., CPU 610. Computer 600 includes one or more storage devices that persistently store programs and other data. A storage device or computer readable medium, as used herein, is a non-transitory computer readable medium. Some examples of a non-transitory computer readable medium include, but are not limited to, storage integral to computer 600, such as memory 650, a hard disk or a solid-state drive, and removable storage, such as an optical disc or a memory stick.

Program code stored in a memory or storage device may be transmitted using any appropriate transmission medium, including but not limited to wireless, wireline, optical fiber cable, RF, or any suitable combination of the foregoing.

Program code for carrying out operations according to various embodiments may be written in any combination of one or more programming languages. The program code may execute entirely on a single device, partly on a single device, as a stand-alone software package, partly on single device and partly on another device, or entirely on the other device. In an embodiment, program code may be stored in a non-transitory medium and executed by a processor to implement functions or acts specified herein. In some cases, the devices referenced herein may be connected through any type of connection or network, including a local area network (LAN) or a wide area network (WAN), or the connection may be made through other devices (for example, through the Internet using an Internet Service Provider), through wireless connections using a mobile network, or through a hard wire connection, such as over a USB connection.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" or "the" preceding an element does not exclude the presence of a plurality of such elements. The mere fact that certain elements are recited in mutually different dependent claims does not indicate that these elements cannot be used in combination. The word "about" or similar relative term as applied to numbers includes ordinary (conventional) rounding of the number with a fixed base such as 5 or 10.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized or omitted as appropriate, as the explicit illustrated examples are used only for descriptive purposes and are not to be construed as limiting.

As used herein, the statement that two or more parts or components are "coupled" shall mean that the parts are joined or operate together either directly or indirectly, e.g., through one or more intermediate parts or components, so long as a link occurs. As used herein, "operatively coupled" means that two or more elements are coupled to operate together or are in communication, unidirectional or bidirectional, with one another. As used herein, the term "number" shall mean one or an integer greater than one (i.e., a plurality). As used herein a "set" shall mean one or more.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method for charging a battery of a primary portable communication device (PCD) operatively connected to a battery powered speaker/microphone accessory, comprising:

in the PCD:
monitoring a battery level of the PCD;
monitoring a battery level of the speaker/microphone accessory;
determining if the battery level of the PCD is below a predetermined first PCD threshold;
determining if the battery level of the speaker/microphone accessory is above a predetermined speaker/microphone accessory threshold;
responsive to determining that the battery level of the PCD is below the predetermined first PCD threshold and the battery level of the speaker/microphone accessory is above the predetermined speaker/microphone accessory threshold, sending from the PCD a first command to the speaker/microphone accessory to cause the speaker/microphone accessory to enter a charging mode that charges the PCD; and
maintaining audio communication functions between the PCD and the speaker/microphone accessory while the speaker/microphone accessory is charging the PCD.

2. The method of claim 1, further comprising:
monitoring the battery level of the PCD while the speaker/microphone accessory is in the charging mode;
determining if the battery level of the PCD has reached a predetermined second PCD threshold; and
responsive to determining that the battery level of the PCD has reached the second PCD threshold, sending a second command from the PCD to the speaker/microphone accessory to cause the speaker/microphone accessory to exit the charging mode.

3. The method of claim 1, further comprising:
monitoring the battery level of the speaker/microphone accessory while the speaker/microphone accessory is in the charging mode;
determining if the battery level of the speaker/microphone accessory has fallen below the speaker/microphone accessory threshold; and
responsive to determining that the battery level of the speaker/microphone accessory has fallen below the speaker/microphone accessory threshold, sending a second command from the PCD to the speaker/microphone accessory to exit the charging mode.

4. The method of claim 1, wherein monitoring the battery level of the speaker/microphone accessory comprises the PCD querying the speaker/microphone accessory via a communication channel between the PCD and the speaker/microphone accessory.

5. A system for charging a primary portable communication device (PCD) operatively connected to a battery powered speaker/microphone accessory, comprising:
a PCD;
a speaker/microphone accessory; and
a cable communicatively operatively coupling the PCD and the speaker/microphone accessory;
wherein the PCD:
monitors a battery level of the PCD;
monitors a battery level of the speaker/microphone accessory;
determines if the battery level of the PCD is below a predetermined first PCD threshold;
determines if the battery level of the speaker/microphone accessory is above a predetermined speaker/microphone accessory threshold;
responsive to determining that the battery level of the PCD is below the predetermined first PCD threshold and the battery level of the speaker/microphone accessory is above the predetermined speaker/microphone accessory threshold, sends from the PCD a first command to the speaker/microphone accessory to cause the speaker/microphone accessory to enter a charging mode that charges the PCD; and maintains audio communication functions between the PCD and the speaker/microphone accessory while the speaker/microphone accessory is charging the PCD.

6. The system of claim 5, wherein the PCD:

monitors the battery level of the PCD while the speaker/microphone accessory is in the charging mode;

determines if the battery level of the PCD has reached a predetermined second PCD threshold; and responsive to determining that the battery level of the PCD has reached the second PCD threshold, sends a second command from the PCD to the speaker/microphone accessory to cause the speaker/microphone accessory to exit the charging mode.

7. The system of claim 5, wherein the PCD:

monitors the battery level of the speaker/microphone accessory while the speaker/microphone accessory is in the charging mode;

determines if the battery level of the speaker/microphone accessory has fallen below the speaker/microphone accessory threshold; and responsive to determining that the battery level of the speaker/microphone accessory has fallen below the speaker/microphone accessory threshold, sends a second command from the PCD to the speaker/microphone accessory to exit the charging mode.

8. The system of claim 5, wherein monitoring the battery level of the speaker/microphone accessory comprises the PCD querying the speaker/microphone accessory via a communication channel between the PCD and the speaker/microphone accessory.

9. A non-transitory computer-readable medium comprising program instructions for charging a primary portable communication device (PCD) operatively connected to a battery powered speaker/microphone accessory, the instructions executable by a processor to cause the processor to:

monitor a battery level of the PCD;

monitor a battery level of the speaker/microphone accessory;

determine if the battery level of the PCD is below a predetermined first PCD threshold;

determine if the battery level of the speaker/microphone accessory is above a predetermined speaker/microphone accessory threshold;

responsive to determining that the battery level of the PCD is below the predetermined first PCD threshold and the battery level of the speaker/microphone accessory is above the predetermined speaker/microphone accessory threshold, send from the PCD a first command to the speaker/microphone accessory to cause the speaker/microphone accessory to enter a charging mode that charges the PCD; and maintain audio communication functions between the PCD and the speaker/microphone accessory while the speaker/microphone accessory is charging the PCD.

10. The non-transitory computer-readable medium of claim 9, wherein the PCD:

monitors the battery level of the PCD while the speaker/microphone accessory is in the charging mode;

determines if the battery level of the PCD has reached a predetermined second PCD threshold; and responsive to determining that the battery level of the PCD has reached the second PCD threshold, sends a second command from the PCD to the speaker/microphone accessory to cause the speaker/microphone accessory to exit the charging mode.

11. The non-transitory computer-readable medium of claim 9, wherein the PCD:

monitors the battery level of the speaker/microphone accessory while the speaker/microphone accessory is in the charging mode;

determines if the battery level of the speaker/microphone accessory has fallen below the speaker/microphone accessory threshold; and responsive to determining that the battery level of the speaker/microphone accessory has fallen below the speaker/microphone accessory threshold, sends a second command from the PCD to the speaker/microphone accessory to exit the charging mode.

12. The non-transitory computer-readable medium of claim 9, wherein monitoring the battery level of the speaker/microphone accessory comprises the PCD querying the speaker/microphone accessory via a communication channel between the PCD and the speaker/microphone accessory.

* * * * *